United States Patent
Sato et al.

(10) Patent No.: US 8,994,216 B2
(45) Date of Patent: Mar. 31, 2015

(54) POWER CONVERSION APPARATUS

(75) Inventors: Eduardo Kazuhide Sato, Minato-ku (JP); Masahiro Kinoshita, Minato-ku (JP); Yushin Yamamoto, Minato-ku (JP); Tatsuaki Amboh, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 702 days.

(21) Appl. No.: 13/055,373

(22) PCT Filed: Jul. 30, 2008

(86) PCT No.: PCT/JP2008/063664
§ 371 (c)(1),
(2), (4) Date: Jan. 21, 2011

(87) PCT Pub. No.: WO2010/013322
PCT Pub. Date: Feb. 4, 2010

(65) Prior Publication Data
US 2011/0127837 A1 Jun. 2, 2011

(51) Int. Cl.
*H02J 7/00* (2006.01)
*H02J 9/06* (2006.01)
*H02M 5/458* (2006.01)

(52) U.S. Cl.
CPC ............. *H02J 9/062* (2013.01); *H02M 5/4585* (2013.01)
USPC .......................................................... 307/66

(58) Field of Classification Search
USPC .......................................................... 307/66
See application file for complete search history.

(56) References Cited

U.S. PATENT DOCUMENTS

| 5,638,266 A * | 6/1997 | Horie et al. ................... 363/132 |
| 5,892,674 A * | 4/1999 | Shimada et al. .............. 363/127 |
| 2008/0238383 A1 * | 10/2008 | Watanabe et al. ............. 323/271 |
| 2009/0284200 A1 | 11/2009 | Iwahori et al. |
| 2010/0039843 A1 | 2/2010 | Takizawa |

FOREIGN PATENT DOCUMENTS

| CA | 2 314 782 A1 | 2/2001 |
| CN | 1635695 A | 7/2005 |
| CN | 2901688 Y | 5/2007 |
| JP | 56 121374 | 9/1981 |
| JP | 8-33233 | 2/1996 |
| JP | 2002369542 | * 6/2001 ............. H02M 7/48 |

(Continued)

OTHER PUBLICATIONS

Office Action issued Jan. 11, 2012 in Korea Application No. 10-2010-7029347 (With English Translation).

(Continued)

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A power conversion apparatus includes an inverter for converting DC power to AC power for supply to a load, a converter for converting AC power from an AC power supply to DC power for supply to the inverter, a DC voltage converter for converting a voltage value of power stored in a storage battery to supply DC power from the storage battery to the inverter when power supply from the AC power supply is faulty, and a filter including a reactor and a capacitor, for removing harmonics generated by the inverter. The inverter includes a three-level circuit which is a multi-level circuit.

5 Claims, 12 Drawing Sheets

(56) References Cited

FOREIGN PATENT DOCUMENTS

| | | | | |
|---|---|---|---|---|
| JP | 2002-516558 | 6/2002 | | |
| JP | 2002 247862 | 8/2002 | | |
| JP | 2002 369542 | 12/2002 | | |
| JP | 2004248479 | * 2/2003 | ............. | H02M 7/48 |
| JP | 2004350471 | * 5/2003 | ............. | A61B 5/055 |
| JP | 2003 299365 | 10/2003 | | |
| JP | 2004 248479 | 9/2004 | | |
| JP | 2004 350471 | 12/2004 | | |
| JP | 2005-333775 | 12/2005 | | |
| JP | 2006 109603 | 4/2006 | | |
| JP | 2006 141165 | 6/2006 | | |
| JP | 2006 238514 | 9/2006 | | |
| JP | 2008141850 | * 11/2006 | ................ | H02J 3/38 |
| JP | 2006 345647 | 12/2006 | | |
| JP | 2007 28860 | 2/2007 | | |
| JP | 2007 89301 | 4/2007 | | |
| JP | 2007 151231 | 6/2007 | | |
| JP | 2007 215344 | 8/2007 | | |
| JP | 2007 215378 | 8/2007 | | |
| JP | 2007 300712 | 11/2007 | | |
| JP | 2008 22625 | 1/2008 | | |
| JP | 2008 141850 | 6/2008 | | |
| JP | 2008 193779 | 8/2008 | | |
| JP | 2009 278732 | 11/2009 | | |
| WO | WO 99/60690 | 11/1999 | | |

OTHER PUBLICATIONS

U.S. Appl. No. 13/057,102, filed Feb. 1, 2011, Sato, et al.
Combined Office Action and Search Report issued Nov. 14, 2012 in Chinese Application No. 200880130518.X (With English Translation).
International Search Report issued Sep. 2, 2008 in PCT/JP08/63664 filed Jul. 30, 2008.
U.S. Appl. No. 13/498,009, filed Mar. 23, 2012, Sato, et al.
U.S. Appl. No. 13/498,515, filed Mar. 27, 2012, Sato, et al.
U.S. Appl. No. 13/879,937, filed Apr. 17, 2013, Kinoshita.
Combined Office Action and Search Report issued Jul. 23, 2014 in Chinese Patent Application No. 200880130518.X (with English translation and English translation of Category of Cited Documents).

* cited by examiner

| Vu | Vv | Vu−Vv |
|---|---|---|
| E/2 | E/2 | 0 |
| E/2 | −E/2 | E |
| −E/2 | E/2 | −E |
| −E/2 | −E/2 | 0 |

| Vu | Vv | Vu-Vv |
|---|---|---|
| E/2 | E/2 | 0 |
| E/2 | 0 | E/2 |
| E/2 | -E/2 | E |
| 0 | E/2 | -E/2 |
| 0 | 0 | 0 |
| 0 | -E/2 | E/2 |
| -E/2 | E/2 | -E |
| -E/2 | 0 | -E/2 |
| -E/2 | -E/2 | 0 |

|  | TWO-LEVEL | THREE-LEVEL | RATIO TO TWO-LEVEL |
|---|---|---|---|
| CONDUCTION LOSS(W) | 417 | 713 | 171% |
| SWITCHING LOSS(W) | 723 | 238 | 33% |
| TOTAL(W) | 1140 | 951 | 83% |

| Q1D | Q2D | Q3D | Q4D | VOLTAGE APPLIED TO REACTOR |
|---|---|---|---|---|
| OFF | ON | ON | OFF | −VB |
| ON | OFF | OFF | ON | E−VB |
| ON | OFF | ON | OFF | E/2−VB |
| OFF | ON | OFF | ON | E/2−VB |

FIG.19

POWER CONVERSION APPARATUS

TECHNICAL FIELD

The present invention relates to a power conversion apparatus for outputting AC power based on DC power, such as an uninterruptible power supply system, a solar power generation system, a fuel cell power generation system, or a secondary battery energy storage system.

BACKGROUND ART

An uninterruptible power supply system has widely been used as a power supply device for supplying AC power to an important load such as a computer system in a stable manner. For example, as disclosed in Japanese Patent Laying-Open No. 2006-109603 (Patent Document 1), an uninterruptible power supply system generally includes a converter for converting AC power to DC power, an inverter for converting DC power to AC power, and a filter for removing harmonics generated by an operation of the inverter. Usually, the converter converts AC power from a commercial AC power supply to DC power, and supplies the DC power to the inverter while charging a power storage device such as a storage battery. The inverter converts DC power to AC power and supplies the AC power to the load. When the commercial AC power supply fails, power from the power storage device such as a storage battery is supplied to the inverter, which continues to supply AC power to the load.

Patent Document 1: Japanese Patent Laying-Open No. 2006-109603

DISCLOSURE OF THE INVENTION

Problems to be Solved by the Invention

The filter above includes a reactor and a capacitor. When a harmonic is great, for example, a reactor having great inductance should be used. For example, the number of turns of a coil may be increased in order to increase inductance of the reactor, however, volume and weight of reactance increase. Therefore, increase in inductance of the reactor leads to a problem of increase in volume and weight of the uninterruptible power supply system. Japanese Patent Laying-Open No. 2006-109603, however, does not show a specific solution to the problem of increase in size of the uninterruptible power supply system described above.

An object of the present invention is to provide a power conversion apparatus having a configuration suitable for achieving reduction in size and lighter weight.

Means for Solving the Problems

In summary, the present invention is directed to a power conversion apparatus including a first conversion device, a DC power supply source, and a filter. The first conversion device includes a first multi-level circuit configured to be able to perform conversion between a DC voltage and an AC voltage varying among at least three voltage values, and converts DC power to AC power for supply to a load. The DC power supply source supplies DC power to the first conversion device. The filter includes a reactor and a capacitor and removes a harmonic generated by the first conversion device.

According to another aspect of the present invention, a power conversion apparatus includes first and second conversion devices, a DC power supply source, and a filter. The first conversion device includes a first multi-level circuit configured to be able to perform conversion between a DC voltage and an AC voltage varying among at least three voltage values, and converts DC power to AC power for supply to a load. The second conversion device converts AC power from an AC power supply to DC power for supply to the first conversion device. The DC power supply source supplies DC power to the first conversion device. The filter includes a reactor and a capacitor and removes a harmonic generated by the first conversion device.

According to yet another aspect of the present invention, a power conversion apparatus includes first, second and third conversion devices and a filter. The first conversion device includes a first multi-level circuit configured to be able to perform conversion between a DC voltage and an AC voltage varying among at least three voltage values, and converts DC power to AC power for supply to a load. The second conversion device converts AC power from an AC power supply to DC power for supply to the first conversion device. The third conversion device converts a voltage value of power stored in a power storage device and supplies DC power from the power storage device to the first conversion device when power supply by the AC power supply is faulty. The filter includes a reactor and a capacitor and removes a harmonic generated by the first conversion device.

Effects of the Invention

According to the present invention, reduction in size and lighter weight of the power conversion apparatus can be achieved.

DESCRIPTION OF THE REFERENCE SIGNS 1 commercial AC power supply; 2 input filter; 3 converter; 3R R-phase arm; 3S S-phase arm; 3T T-phase arm; 4, 41 inverter; 4U, 41U U-phase arm; 4V, 41V V-phase arm; 4W W-phase arm; 5 output filter; 6 load; 7 DC voltage converter; 8 storage battery; 10 control device; 11, 11R, 11S, 11T, 15, 16, 19, 19U, 19V, 19W capacitor; 12, 12R, 12S, 12T, 18, 18U, 18V, 18W reactor; 13, 42 DC positive bus; 14, 43 DC negative bus; 17 DC neutral point bus; 21, O neutral point; 22, 22N, 22P, 45 reactor; 23, 44 semiconductor switch; 31, 36 voltage sensor; 32, 37 current sensor; 33 power failure detection circuit; 100 uninterruptible power supply system; CA, CB, CC, CD capacitor; D1D to D4D, D1R to D6R, D1S to D6S, D1T to D6T, D1U to D6U, D1V to D6V, D1W to D6W, DA, DB, DC, DD diode; Q1D to Q4D, Q1R to Q4R, Q1S to Q4S, Q1T to Q4T, Q1U to Q4U, Q1V to Q4V, Q1W to Q4W, QA, QB, QC, QD IGBT element; RL R-phase line; SL S-phase line; TL T-phase line; UL U-phase line; VL V-phase line; and WL W-phase line.

BEST MODES FOR CARRYING OUT THE INVENTION

An embodiment of the present invention will be described hereinafter in detail with reference to the drawings. It is noted that the same or corresponding elements in the drawings have the same reference characters allotted and description thereof will not be repeated.

Figure 1:
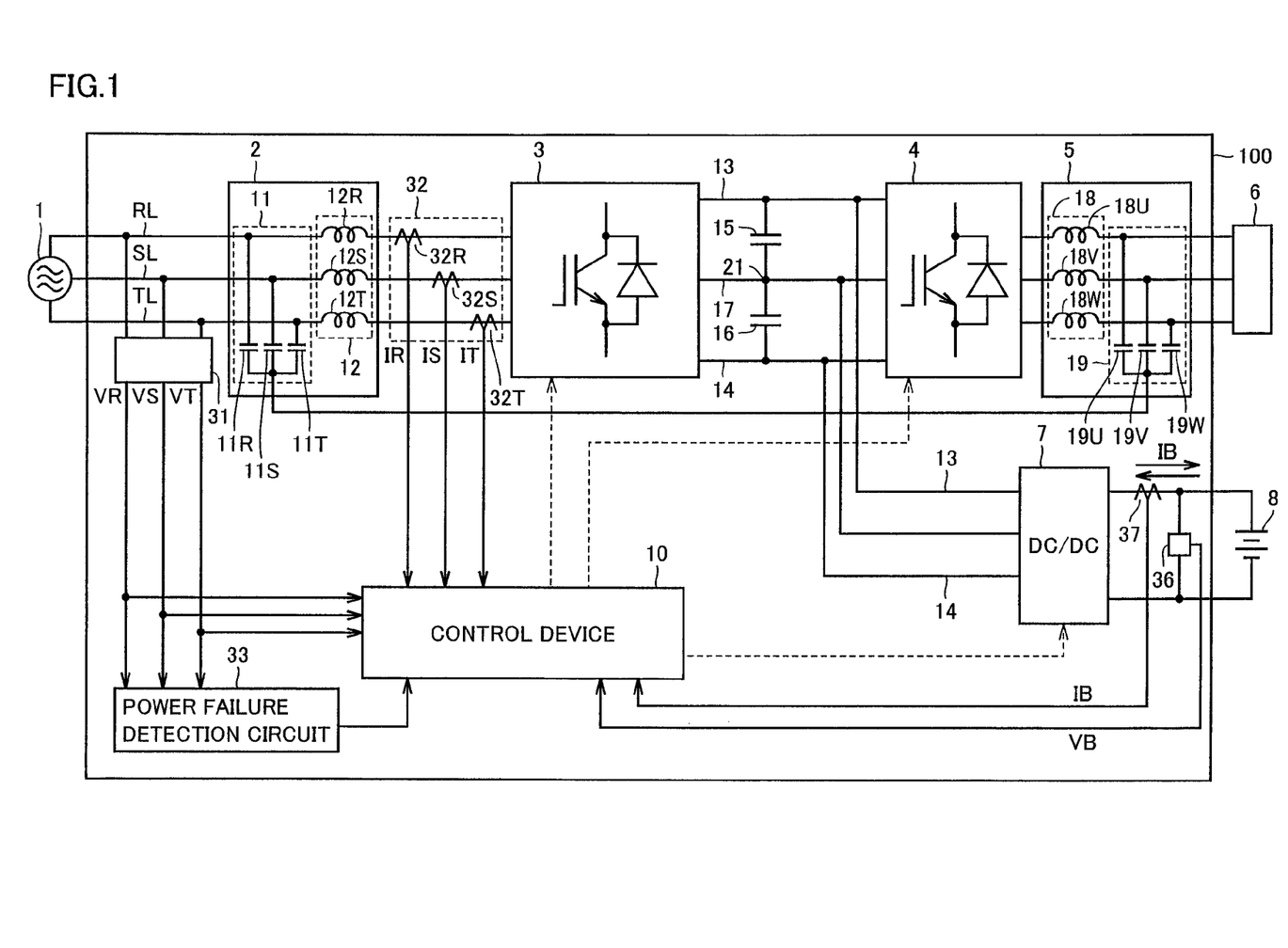
FIG. 1 is a schematic block diagram showing a main circuit configuration of an uninterruptible power supply system 100 according to an embodiment of the present invention.

FIG. 1 is a schematic block diagram showing a main circuit configuration of an uninterruptible power supply system 100 according to an embodiment of the present invention. Referring to FIG. 1, uninterruptible power supply system 100 includes an input filter 2, a converter 3, an inverter 4, an output filter 5, a DC voltage converter (denoted as "DC/DC" in the drawing) 7, a control device 10, a DC positive bus 13, a DC negative bus 14, capacitors 15 and 16, a DC neutral point bus 17, voltage sensors 31 and 36, current sensors 32 and 37, a power failure detection circuit 33, an R-phase line RL, an S-phase line SL, and a T-phase line TL.

Input filter 2 prevents leakage of harmonics to commercial AC power supply 1. Commercial AC power supply 1 is a three-phase AC power supply. Input filter 2 is a three-phase LC filter circuit constituted of a capacitor 11 (capacitors 11R, 11S and 11T) and a reactor 12 (reactors 12R, 12S and 12T).

Converter 3 converts three-phase AC power supplied from commercial AC power supply 1 through input filter 2 into DC power and supplies the DC power to inverter 4 through DC positive bus 13 and DC negative bus 14. Inverter 4 converts the DC power from converter 3 into three-phase AC power. As will be described later, converter 3 and inverter 4 are each implemented by a three-level circuit. Converter 3 and inverter 4 are connected to each other through DC positive bus 13, DC negative bus 14 and DC neutral point bus 17.

Capacitors 15 and 16 are connected in series between DC positive bus 13 and DC negative bus 14 and they smoothen a voltage across DC positive bus 13 and DC negative bus 14. DC neutral point bus 17 is connected to a neutral point 21 which is a point of connection between capacitors 15 and 16.

The AC power from inverter 4 is supplied to a load 6 through output filter 5. Output filter 5 removes harmonics generated by an operation of inverter 4. Output filter 5 is a three-phase LC filter circuit constituted of a reactor 18 (reactors 18U, 18V and 18W) and a capacitor 19 (capacitors 19U, 19V and 19W).

DC voltage converter 7 carries out conversion between a DC voltage across DC positive bus 13 and DC negative bus 14 and a voltage of a storage battery 8. It is noted that a power storage device that can be charged and can discharge should only be connected to DC voltage converter 7, and for example, an electric double layer capacitor may be connected to DC voltage converter 7. In addition, though storage battery 8 is installed outside uninterruptible power supply system 100 in the present embodiment, storage battery 8 may be contained in uninterruptible power supply system 100.

Voltage sensor 31 detects a voltage VR of the R-phase line, a voltage VS of the S-phase line, and a voltage VT of the T-phase line, and outputs three-phase voltage signals indicating respective voltages VR, VS and VT to control device 10 and power failure detection circuit 33. Current sensor 32 detects a current IR of the R-phase line, a current IS of the S-phase line, and a current IT of the T-phase line and outputs three-phase current signals indicating respective voltages IR, IS and IT to control device 10.

Power failure detection circuit 33 detects power failure of commercial AC power supply 1 based on the three-phase voltage signal from voltage sensor 31. Power failure detection circuit 33 outputs a power failure signal indicating power failure of commercial AC power supply 1 to control device 10. Voltage sensor 36 detects a voltage VB across positive and negative electrodes of storage battery 8 and outputs a signal indicating voltage VB to control device 10. Current sensor 37 detects a current IB input and output to/from storage battery 8 and outputs a signal indicating current IB to control device 10.

Control device 10 controls operations of converter 3, inverter 4 and DC voltage converter 7. Though detailed description will be provided later, each of converter 3, inverter 4 and DC voltage converter 7 is implemented by a semiconductor switch including a semiconductor switching element. In the present embodiment, an IGBT (Insulated Gate Bipolar Transistor) is employed as the semiconductor switching element. In addition, in the present embodiment, PWM (Pulse Width Modulation) control is applicable as a method of controlling the semiconductor switching element. Control device 10 carries out PWM control, upon receiving the three-phase voltage signal from voltage sensor 31, the three-phase current signal from current sensor 32, the power failure signal from power failure detection circuit 33, the signal indicating voltage VB detected by voltage sensor 36, the signal indicating current IB detected by current sensor 37, and the like.

An operation of uninterruptible power supply system 100 according to the present embodiment will now be described. While commercial AC power supply 1 can normally supply AC power, converter 3 converts AC power from commercial AC power supply 1 to DC power and inverter 4 converts the DC power into AC power and supplies the AC power to load 6. DC voltage converter 7 converts the DC voltage from converter 3 into a voltage suitable for charging storage battery 8, so that storage battery 8 is charged. On the other hand, when the commercial AC power supply fails, control device 10 stops converter 3 based on the power failure signal from power failure detection circuit 33. In addition, control device 10 operates DC voltage converter 7 such that DC power is supplied from storage battery 8 to inverter 4, thus causing inverter 4 to continue supply of AC power. Here, DC voltage converter 7 converts the voltage of storage battery 8 into a voltage suitable as an input voltage for inverter 4. Thus, AC power can be supplied to an AC load in a stable manner.

Figure 2:
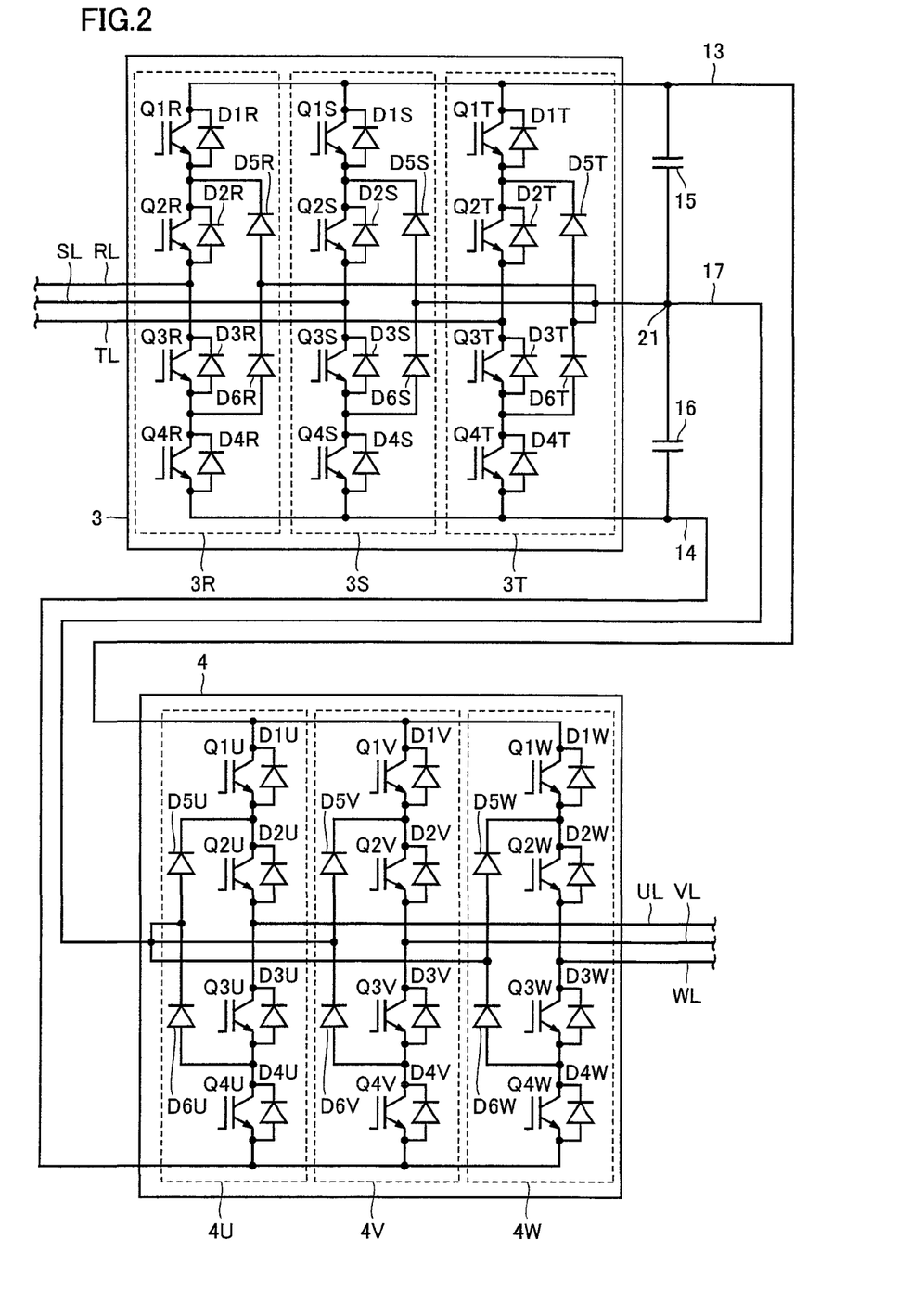
FIG. 2 is a circuit diagram illustrating in detail a configuration of a converter 3 and an inverter 4 shown in FIG. 1.

FIG. 2 is a circuit diagram illustrating in detail a configuration of converter 3 and inverter 4 shown in FIG. 1. Referring to FIG. 2, converter 3 includes an R-phase arm 3R, an S-phase arm 3S and a T-phase arm 3T. Inverter 4 includes a U-phase arm 4U, a V-phase arm 4V and a W-phase arm 4W.

The arm of each phase (3R, 3S, 3T) of converter 3 and the arm of each phase (4U, 4V, 4W) of inverter 4 are each implemented by a three-level circuit, and each of them includes four IGBT elements and six diodes. Specifically, R-phase arm 3R includes IGBT elements Q1R to Q4R and diodes D1R to D6R. S-phase arm 3S includes IGBT elements Q1S to Q4S and diodes D1S to D6S. T-phase arm 3T includes IGBT elements Q1T to Q4T and diodes D1T to D6T. U-phase arm 4U includes IGBT elements Q1U to Q4U and diodes D1U to D6U. V-phase arm 4V includes IGBT elements Q1V to Q4V and diodes D1V to D6V. W-phase arm 4W includes IGBT elements Q1W to Q4W and diodes D1W to D6W.

Hereinafter, in order to collectively describe the arm of each phase of converter 3 and the arm of each phase of inverter 4, reference characters R, S, T, U, V, and W are collectively denoted as a reference character "x". IGBT elements Q1x to Q4x are connected in series between DC positive bus 13 and DC negative bus 14. Diodes D1x to D4x are connected in anti-parallel to IGBT elements Q1x to Q4x respectively. Diode D5x is connected to a point of connection between IGBT elements Q1x and Q2x and neutral point 21. Diode D6x is connected to a point of connection between IGBT elements Q3x and Q4x and neutral point 21. It is noted that diode D5x has a cathode connected to the point of connection between IGBT elements Q1x and Q2x and has an anode connected to neutral point 21. Diode D6x has an anode connected to the point of connection between IGBT elements Q3x and Q4x and has a cathode connected to neutral point 21. Diodes D1x to D4x function as free-wheeling diodes, and diodes D5x and D6x function as clamp diodes.

In the arm of each phase (3R, 3S, 3T) of converter 3, a point of connection between IGBT elements Q2x and Q3x corresponds to an AC input terminal, and a point of connection between diodes D5x and D6x corresponds to a DC output terminal. Meanwhile, in the arm of each phase (4U, 4V, 4T) of inverter 4, the point of connection between diodes D5x and D6x corresponds to a DC input terminal, and the point of connection between IGBT elements Q2x and Q3x corresponds to an AC output terminal. The AC input terminal of the arm of each phase (3R, 3S, 3T) of converter 3 is connected to a corresponding line (R-phase line RL, S-phase line SL, T-phase line TL), and the AC output terminal of the arm of each phase (4U, 4V, 4S) of inverter 4 is connected to a corresponding line (U-phase line UL, V-phase line VL, W-phase line WL). The DC output terminal of the arm of each phase of converter 3 and the DC input terminal of the arm of each phase of inverter 4 are connected to neutral point 21.

Figure 3:
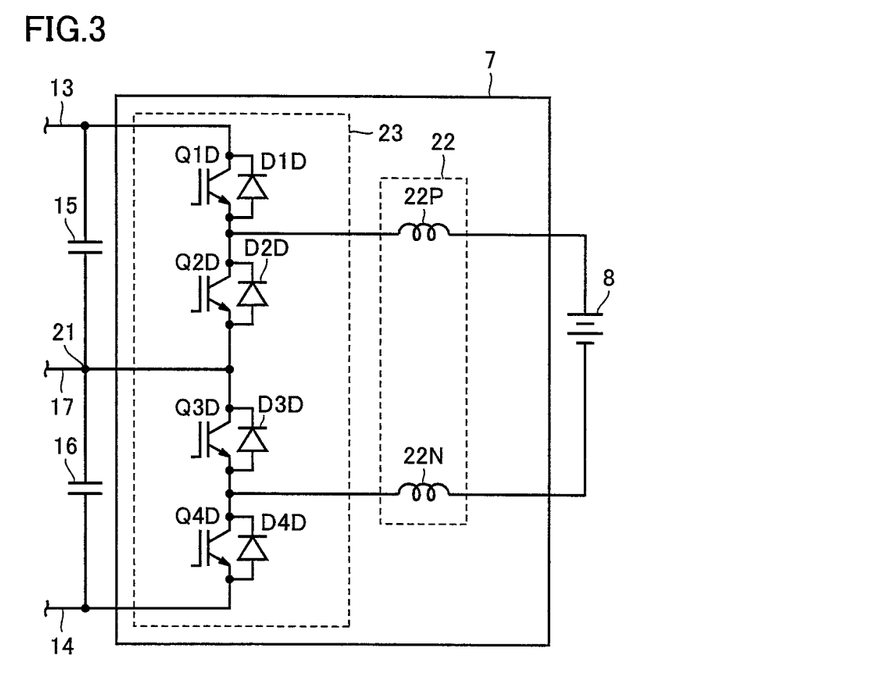
FIG. 3 is a diagram illustrating in detail a configuration of a DC voltage converter 7 shown in FIG. 1.

FIG. 3 is a diagram illustrating in detail a configuration of DC voltage converter 7 shown in FIG. 1. Referring to FIG. 3, DC voltage converter 7 includes a reactor 22 and a semiconductor switch 23. Semiconductor switch 23 includes IGBT elements Q1D to Q4D connected in series between DC positive bus 13 and DC negative bus 14 and diodes D1D to D4D connected in anti-parallel to IGBT elements Q1D to Q4D respectively.

In semiconductor switch 23, one end of a reactor 22P is connected to a point of connection between IGBT elements Q1D and Q2D and one end of a reactor 22N is connected to a point of connection between IGBT elements Q3D and Q4D. The other end of reactor 22P is connected to the positive electrode of storage battery 8 and the other end of reactor 22N is connected to the negative electrode of storage battery 8.

As described above, in uninterruptible power supply system 100 according to the present embodiment, converter 3 and inverter 4 are each implemented by a three-level circuit. In the conventional power conversion apparatus, for the purpose of decrease or the like in the number of semiconductor switching elements, an inverter is generally implemented by a two-level circuit. By implementing the inverter with a three-level circuit, harmonics can be suppressed more than in the conventional power conversion apparatus.

Figure 4:
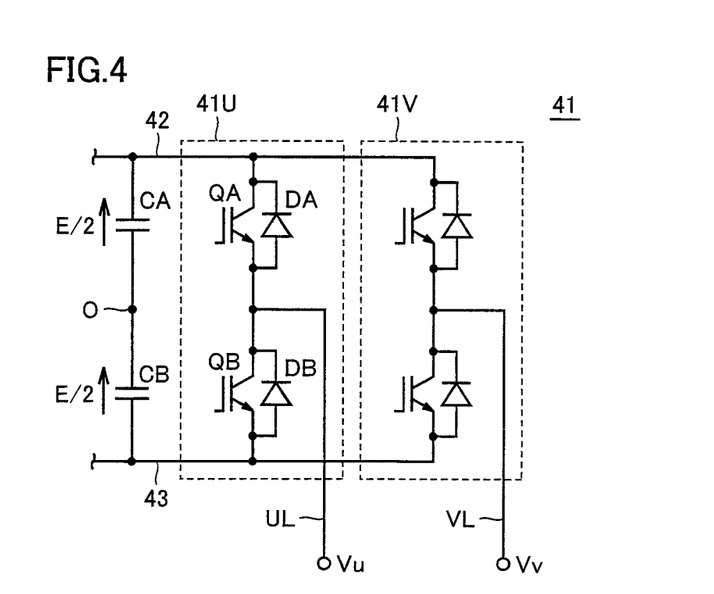
FIG. 4 is a diagram showing a single-phase inverter implemented by a two-level circuit.

FIG. 4 is a diagram showing a single-phase inverter implemented by a two-level circuit. Referring to FIG. 4, an inverter 41 includes a U-phase arm 41U and a V-phase arm 41V. U-phase arm 41U and V-phase arm 41V are connected in parallel between a DC positive bus 42 and a DC negative bus 43 and they are identical in configuration. U-phase arm 41U includes IGBT elements QA and QB connected in series between DC positive bus 42 and DC negative bus 43 and diodes DA and DB connected in anti-parallel to IGBT elements QA and QB respectively. U-phase line UL is connected to a point of connection between IGBT elements QA and QB. V-phase arm 41V has such a configuration that U-phase line UL in the configuration of U-phase arm 41U above is replaced with V-phase line VL.

Capacitors CA and CB are connected in series between DC positive bus 42 and DC negative bus 43. A neutral point O is a point of connection between capacitors CA and CB. A voltage across opposing ends of capacitor CA and a voltage across opposing ends of capacitor CB are both E/2 (E being a prescribed value).

Figure 5:
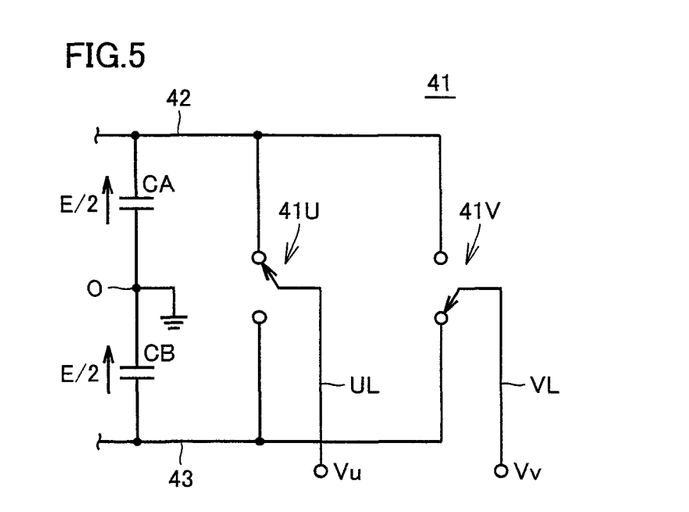
FIG. 5 is an equivalent circuit of an inverter 41 shown in FIG. 4.

FIG. 5 is an equivalent circuit of inverter 41 shown in FIG. 4. Referring to FIG. 5, U-phase arm 41U is equivalent to a switch that switches connection of U-phase line UL between DC positive bus 42 and DC negative bus 43. Considering an example where neutral point O is grounded, when the switch operates, a voltage Vu of U-phase line UL switches between E/2 and −E/2. A voltage Vv of V-phase line VL varies similarly to voltage Vu. Thus, the two-level circuit converts a DC voltage E to an AC voltage having two values (E/2, −E/2).

Figure 6:
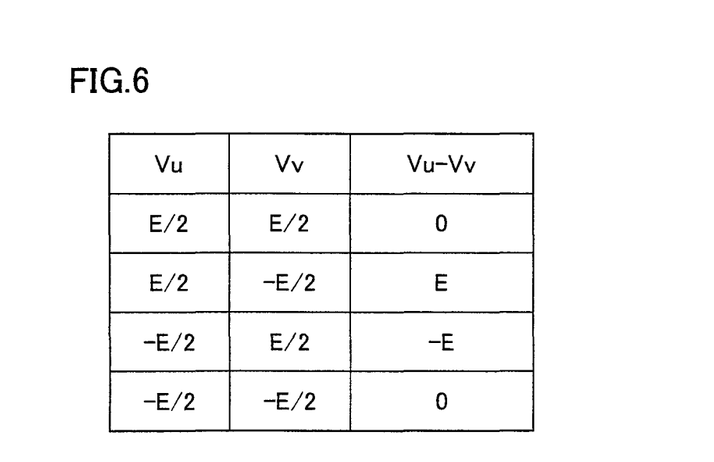
FIG. 6 is a diagram showing a line voltage of inverter 41.

FIG. 6 is a diagram showing a line voltage of inverter 41. Referring to FIG. 6, a line voltage (a difference between voltage Vu and voltage Vv) switches between E, 0, and −E. In an inverter implemented by a two-level circuit (a two-level inverter), a minimum variation of the line voltage is equal to voltage E.

Figure 7:
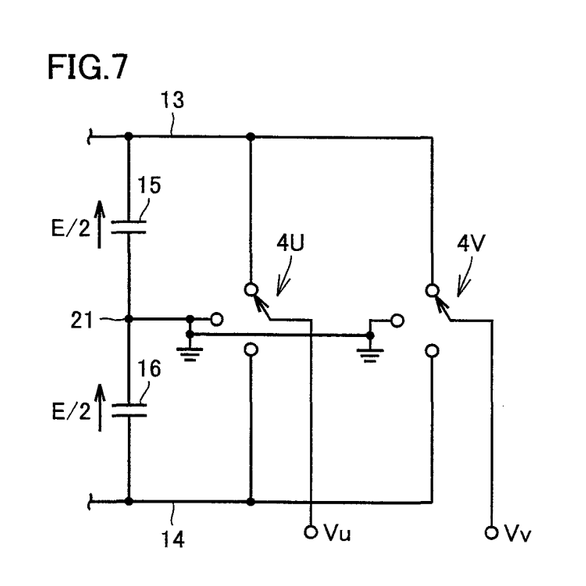
FIG. 7 is an equivalent circuit diagram of a U-phase arm 4U and a V-phase arm 4V of inverter 4 shown in FIG. 2.

FIG. 7 is an equivalent circuit diagram of U-phase arm 4U and V-phase arm 4V of inverter 4 shown in FIG. 2. Referring to FIG. 7, U-phase arm 4U is equivalent to a switch that switches connection of U-phase line UL between DC positive bus 13, neutral point 21, and DC negative bus 14. When this switch operates, voltage Vu of U-phase line UL switches between E/2, 0 and −E/2. Voltage Vv of V-phase line VL also varies similarly to voltage Vu. Thus, the three-level circuit is a circuit capable of performing conversion between a DC voltage and an AC voltage having three values.

Figure 8:
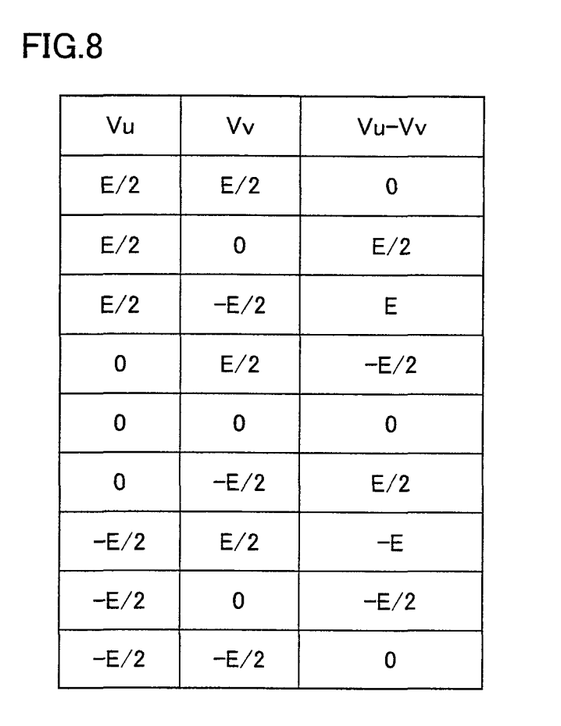
FIG. 8 is a diagram showing a line voltage of a single-phase, three-level inverter shown in FIG. 7.

FIG. 8 is a diagram showing a line voltage of a single-phase, three-level inverter shown in FIG. 7. Referring to FIG. 7, the line voltage (a difference between voltage Vu and voltage Vv) switches in a range of E, E/2, 0, −E/2, and −E. In an inverter implemented by a three-level circuit (a three-level inverter), a minimum variation of the line voltage is equal to E/2.

It can be seen from FIGS. 6 and 8 that the three-level inverter is smaller in variation of the line voltage than the two-level inverter. Since a waveform of an output voltage of the inverter finely varies as the variation of the line voltage is smaller, the waveform can be closer to a sinusoidal wave. As the voltage waveform is closer to the sinusoidal wave, harmonics generated by the operation of the inverter can be made smaller. Therefore, harmonics can be made smaller by the three-level inverter than the two-level inverter.

Figure 9:
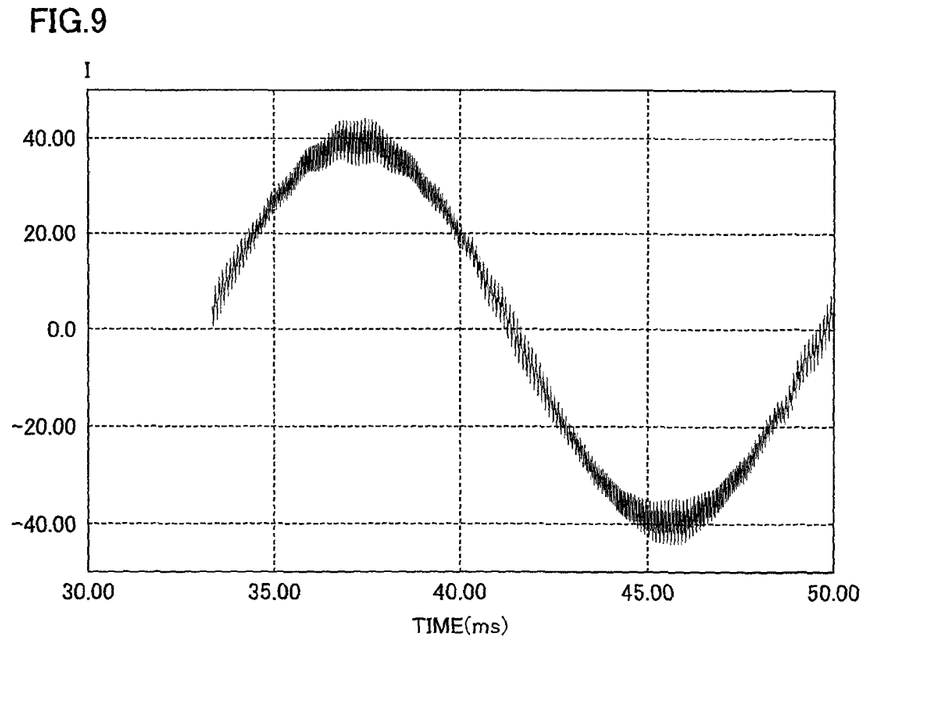
FIG. 9 is a diagram showing a result of simulation of a reactor current in an example where a filter reactor provided on an output side of a two-level inverter is set to 5% and the inverter is switched at a frequency of 10 kHz.
Figure 10:
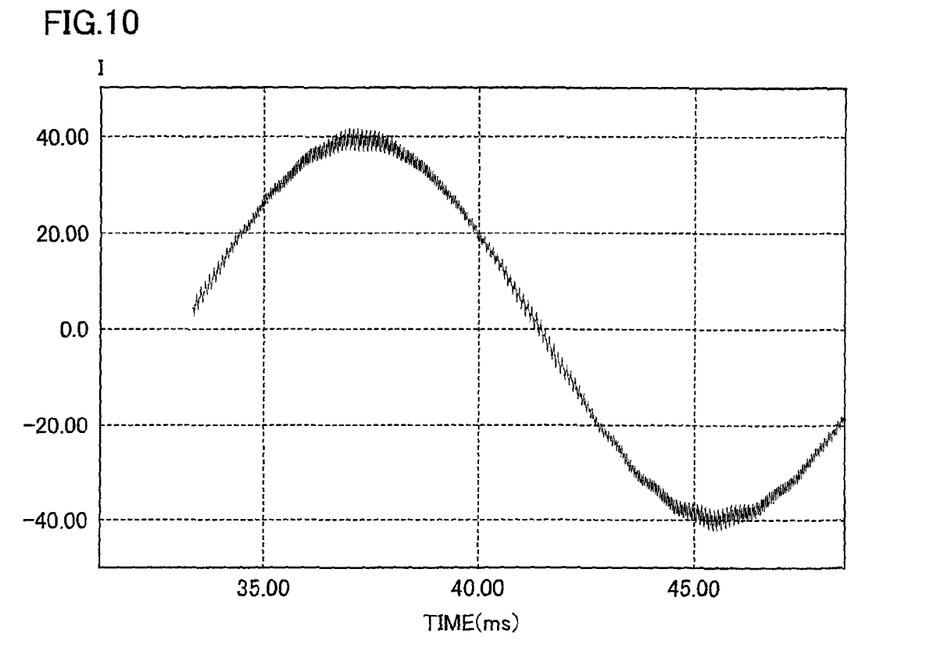
FIG. 10 is a diagram showing a result of simulation of a reactor current in an example where a filter reactor provided on an output side of a two-level inverter is set to 10% and the inverter is switched at a frequency of 10 kHz.

FIG. 9 is a diagram showing a result of simulation of a reactor current in an example where a filter reactor provided on an output side of a two-level inverter is set to 5% and the inverter is switched at a frequency of 10 kHz. FIG. 10 is a diagram showing a result of simulation of a reactor current in an example where a filter reactor provided on an output side of a two-level inverter is set to 10% and the inverter is switched at a frequency of 10 kHz. Comparing total harmonic distortion (THD) based on simulation in FIGS. 9 and 10, THD is 6.4% when reactor inductance is set to 5%, whereas THD decreases to 3.2% by increasing reactor inductance to 10%.

THD represents a ratio between the sum of effective values of harmonic components and effective values of fundamental waves. Smaller THD means smaller harmonic components. FIGS. 9 and 10 show that THD decreases by increasing reactor inductance. If reactor inductance is increased in order to make the harmonic components smaller, it is necessary, for example, to increase the number of turns of a coil, and a problem of increase in volume and weight of the reactor arises.

Figure 11:
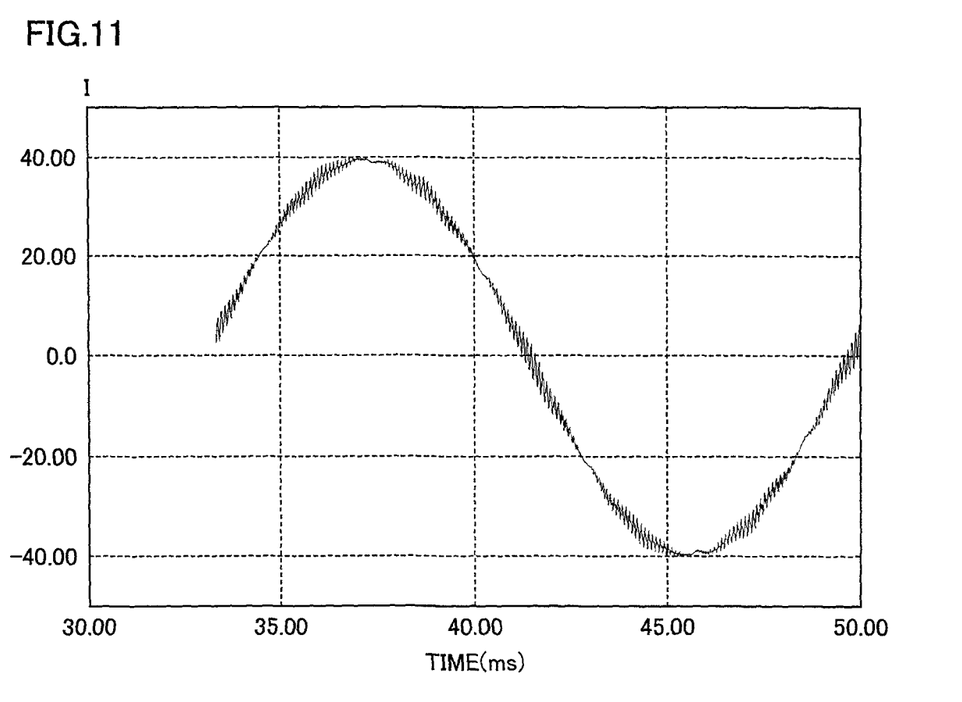
FIG. 11 is a diagram showing a result of simulation of a reactor current in an example where a filter reactor provided on an output side of a three-level inverter is set to 5% and the inverter is switched at a frequency of 10 kHz.

FIG. 11 is a diagram showing a result of simulation of a reactor current in an example where a filter reactor provided on an output side of a three-level inverter is set to 5% and the inverter is switched at a frequency of 10 kHz. Referring to FIGS. 11 and 9, it can be seen that the three-level inverter can suppress harmonic components more than the two-level inverter provided that filter reactors are identical in inductance. In the simulation result shown in FIG. 11, THD was 3.2%.

Figure 12:
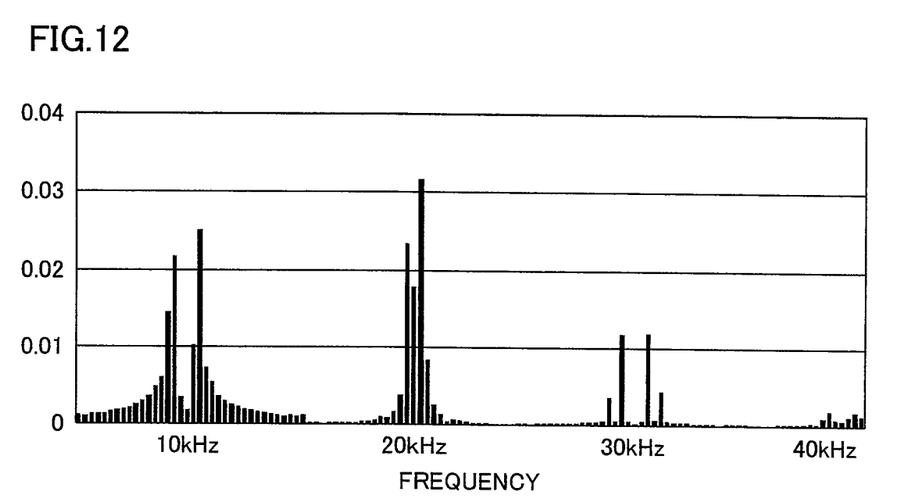
FIG. 12 is a diagram showing a frequency spectrum of a harmonic current (FIG. 9) generated by the two-level inverter.
Figure 13:
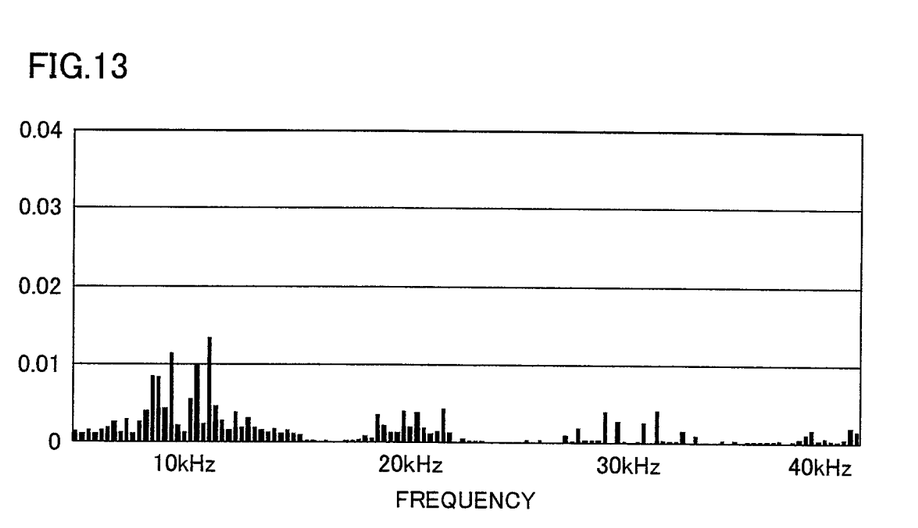
FIG. 13 is a diagram showing a frequency spectrum of a harmonic current (FIG. 11) generated by the three-level inverter.

FIG. 12 is a diagram showing a frequency spectrum of a harmonic current (FIG. 9) generated by the two-level inverter. FIG. 13 is a diagram showing a frequency spectrum of a harmonic current (FIG. 11) generated by the three-level inverter. Referring to FIGS. 12 and 13, it can be seen that the three-level inverter can suppress harmonics more than the two-level inverter, regardless of a frequency. It is noted that frequency spectra in FIGS. 12 and 13 could be obtained by simulation. In simulation, a DC voltage input to the inverter was set to 500 V, a three-phase resistance load of 10 kW was adopted as a load, and an output voltage (line voltage) was set to 208 Vrms.

Thus, according to the present embodiment, by implementing an inverter with a three-level circuit, harmonics generated by the inverter can be made smaller. As a reactor having small inductance can thus be used for the filter, the reactor can have smaller volume and weight. Therefore, according to the present embodiment, reduction in size and lighter weight of the power conversion apparatus can be achieved.

In the present embodiment, the following effects can also be obtained by implementing an inverter with a three-level circuit. In the power conversion apparatus, a storage battery or the like having large capacity is connected, as a DC power supply, to a DC capacitor on the input side of the inverter. When fluctuation of a potential to ground becomes greater during operation of the inverter, an amount of generated noise increases due to a large stray capacitance of a DC circuit. Since variation of the output voltage becomes greater by implementing inverter 4 with a two-level inverter, fluctuation of a potential to ground also becomes greater. In the present embodiment, however, by implementing inverter 4 with a three-level inverter, variation of the output voltage thereof can be made smaller than in a case of a two-level inverter. As fluctuation of a potential to ground can thus be made smaller, an amount of generated noise can be decreased.

Figure 14:
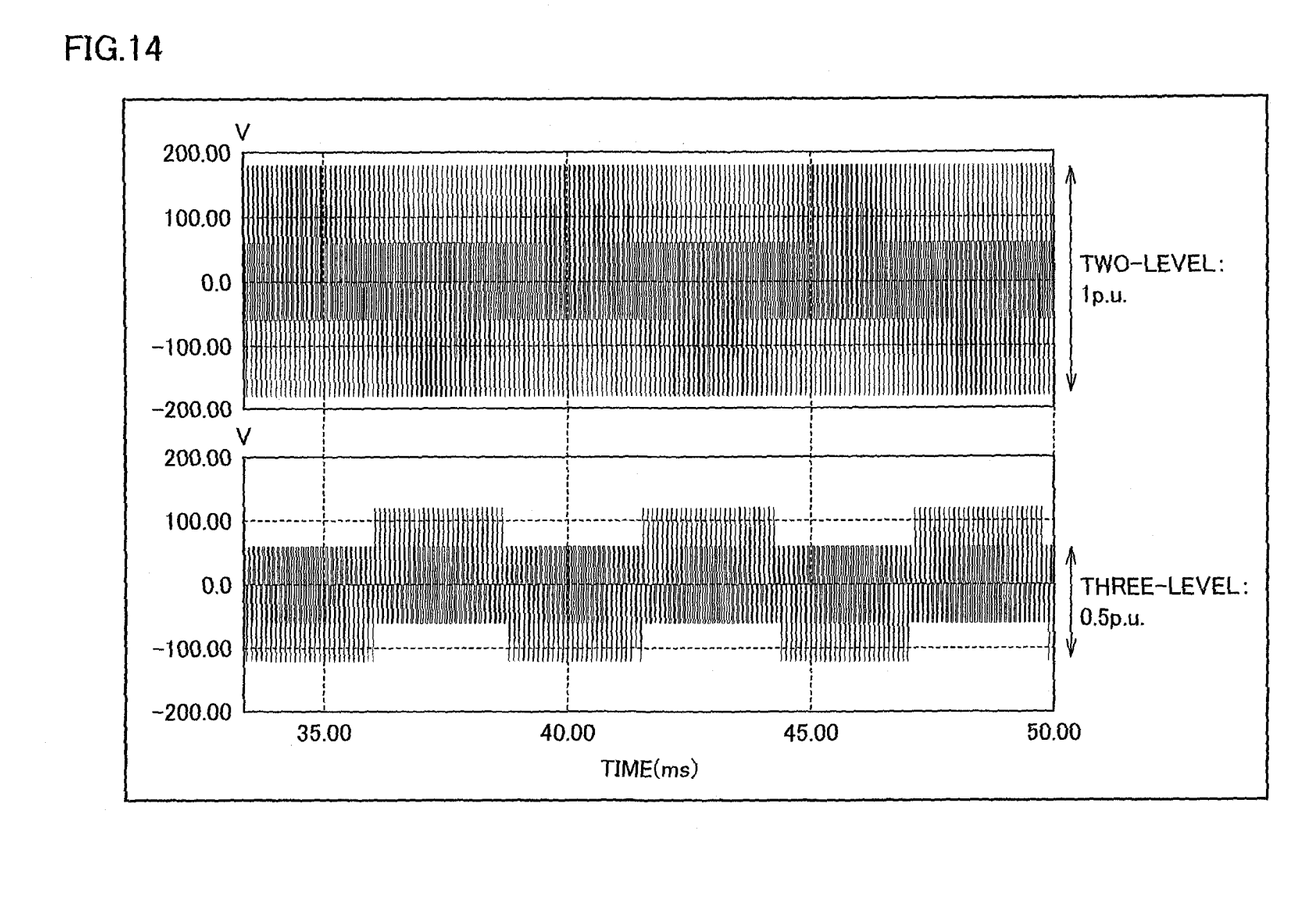
FIG. 14 is a diagram showing a result of simulation of fluctuation of a potential to ground of the two-level inverter and fluctuation of a potential to ground of the three-level inverter.

FIG. 14 is a diagram showing a result of simulation of fluctuation of a potential to ground of the two-level inverter and fluctuation of a potential to ground of the three-level inverter. In simulation, a DC voltage input to the inverter was set to 360 V. Referring to FIG. 14, assuming fluctuation of a potential to ground in the two-level inverter as 1 [p.u], fluctuation of a potential to ground in the three-level inverter is 0.5 [p.u]. As shown in FIG. 14, the three-level inverter can achieve smaller fluctuation of a potential to ground.

In addition, according to the present embodiment, loss in inverter 4 can be decreased. Loss in inverter 4 specifically refers to conduction loss (loss in each of the IGBT element and the diode when they are fed with power) and switching loss in the IGBT element.

Figure 15:
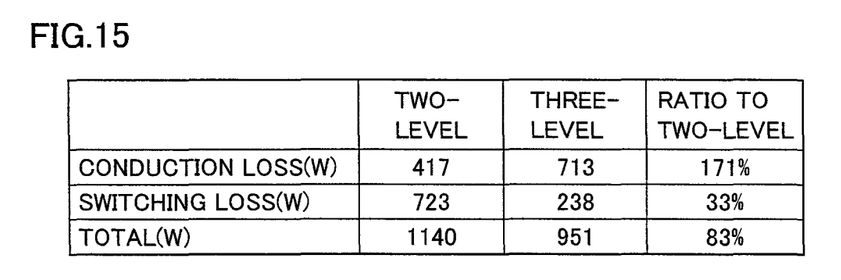
FIG. 15 is a diagram showing a result of simulation of loss in the two-level inverter and the three-level inverter.
Figure 16:
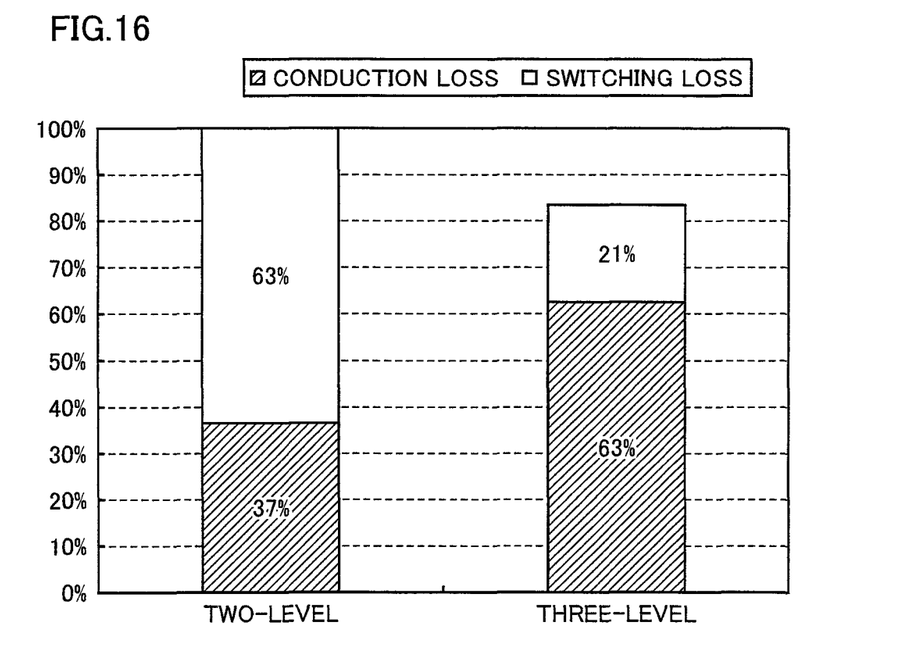
FIG. 16 is a diagram illustrating a breakdown of the loss in the two-level inverter and the three-level inverter.

FIG. 15 is a diagram showing a result of simulation of loss in the two-level inverter and the three-level inverter. FIG. 16 is a diagram illustrating a breakdown of the loss in the two-level inverter and the three-level inverter. In this simulation, a DC input voltage was set to 600 V, a switching frequency was set to 10 kHz, an AC output voltage (line voltage) was set to 380 Vrms, and magnitude of a load was set to 275 kW. It is noted that the IGBT element included in the two-level inverter is a 1200V-600 A product and the IGBT element included in the three-level inverter is a 600V-600 A product.

Referring to FIGS. 15 and 16, the entire loss in the three-level inverter is equal to 83% of the entire loss in the two-level inverter, because switching loss is decreased. As shown in FIG. 15, the three-level inverter is smaller in switching loss than the two-level inverter (33%), because a voltage applied to a single semiconductor switching element can be lowered in the three-level inverter as compared with the two-level inverter.

As shown in FIG. 16, in the two-level inverter, switching loss occupies most (63%) of the entire loss. The three-level inverter can achieve significant decrease in the switching loss. Therefore, in the three-level inverter, though conduction loss increases as compared with the two-level inverter, the entire loss can be smaller than in the two-level inverter. By decreasing loss in the inverter, operation efficiency of the power conversion apparatus can be enhanced.

In the present embodiment, since converter 3 is also implemented by a three-level circuit, an effect the same as in inverter 4 can also be achieved by converter 3. Specifically, a reactor included in an input filter can be reduced in size. Thus, reduction in size and lighter weight of the power conversion apparatus can further be achieved. In addition, since fluctuation of a potential to ground can be suppressed, an amount of noise generated by converter 3 can also be lowered. Moreover, since loss in converter 3 can be decreased, operation efficiency of the power conversion apparatus can be enhanced. In addition to these effects, since common components can be used in converter 3 and inverter 4, cost for the power conversion apparatus can be reduced.

Figure 17:
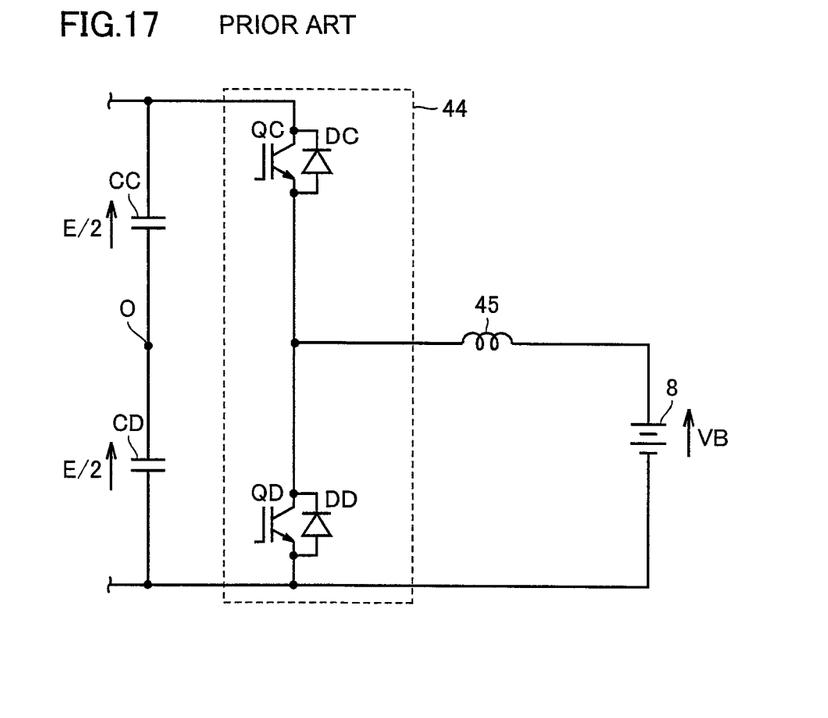
FIG. 17 is a diagram showing a configuration of a semiconductor switch included in a conventional DC voltage converter.

Further, DC voltage converter 7 has conventionally had such a configuration that two IGBT elements QC and QD are connected in series as shown in a semiconductor switch 44 in FIG. 17. As shown in FIG. 3, in the present embodiment, ripple components in a current that flows through reactor 22 are decreased by implementing a semiconductor switch by connecting four IGBT elements in series. In the case of the configuration in FIG. 17, when IGBT element QC is ON and IGBT element QD is OFF, a voltage of (E−VB) is applied to a reactor 45, and when IGBT element QC is OFF and IGBT element QD is ON, a voltage of (−VB) is applied to reactor 45. Therefore, a reactor voltage difference produced by switching is E. In contrast, in the configuration in FIG. 3, when only IGBT elements Q2D and Q3D are turned ON, a voltage of (−VB) is applied to reactor 22, and when only IGBT elements Q1D and Q4D are turned ON, a voltage of (E−VB) is applied to reactor 22. Other than these examples, there is an example where only IGBT elements Q1D and Q3D are turned ON or an example where only IGBT elements Q2D and Q4D are turned ON, and in such a case, a voltage of E/2−VB is applied to reactor 22.

Figure 18:
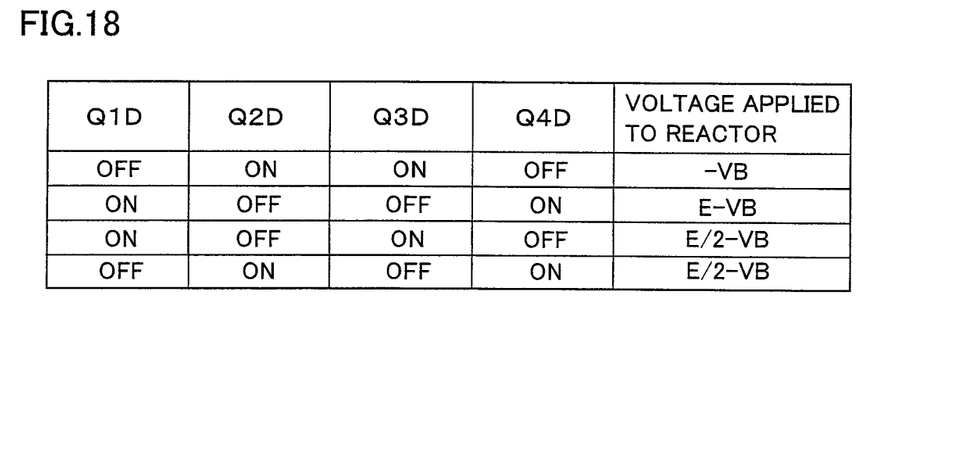
FIG. 18 is a diagram showing a switching pattern of IGBT elements Q1D to Q4D in FIG. 3 and a voltage applied to a reactor 22.

FIG. 18 shows a switching pattern of IGBT elements Q1D to Q4D and a voltage applied to reactor 22. It can be seen from FIG. 18 that a voltage that can be applied to reactor 22 by DC voltage converter 7 also has three levels. According to the configuration in FIG. 3, the reactor voltage difference produced by switching can be set to E/2 and ripple components in a current that flows through reactor 22 can be decreased. Thus, inductance of reactor 22 can be decreased and reactor 22 can be reduced in size, and therefore reduction in size and lighter weight of the power conversion apparatus can further be achieved.

In the present embodiment, a three-level circuit has been shown, however, a circuit implementing an inverter, a converter or a DC voltage converter should only be a circuit (a multi-level circuit) that performs conversion between a DC voltage and an AC voltage or a DC voltage having at least three voltage values. Therefore, a five-level circuit for performing conversion between a DC voltage and an AC voltage having at least five voltage values is applicable to an inverter or the like.

Figure 19:
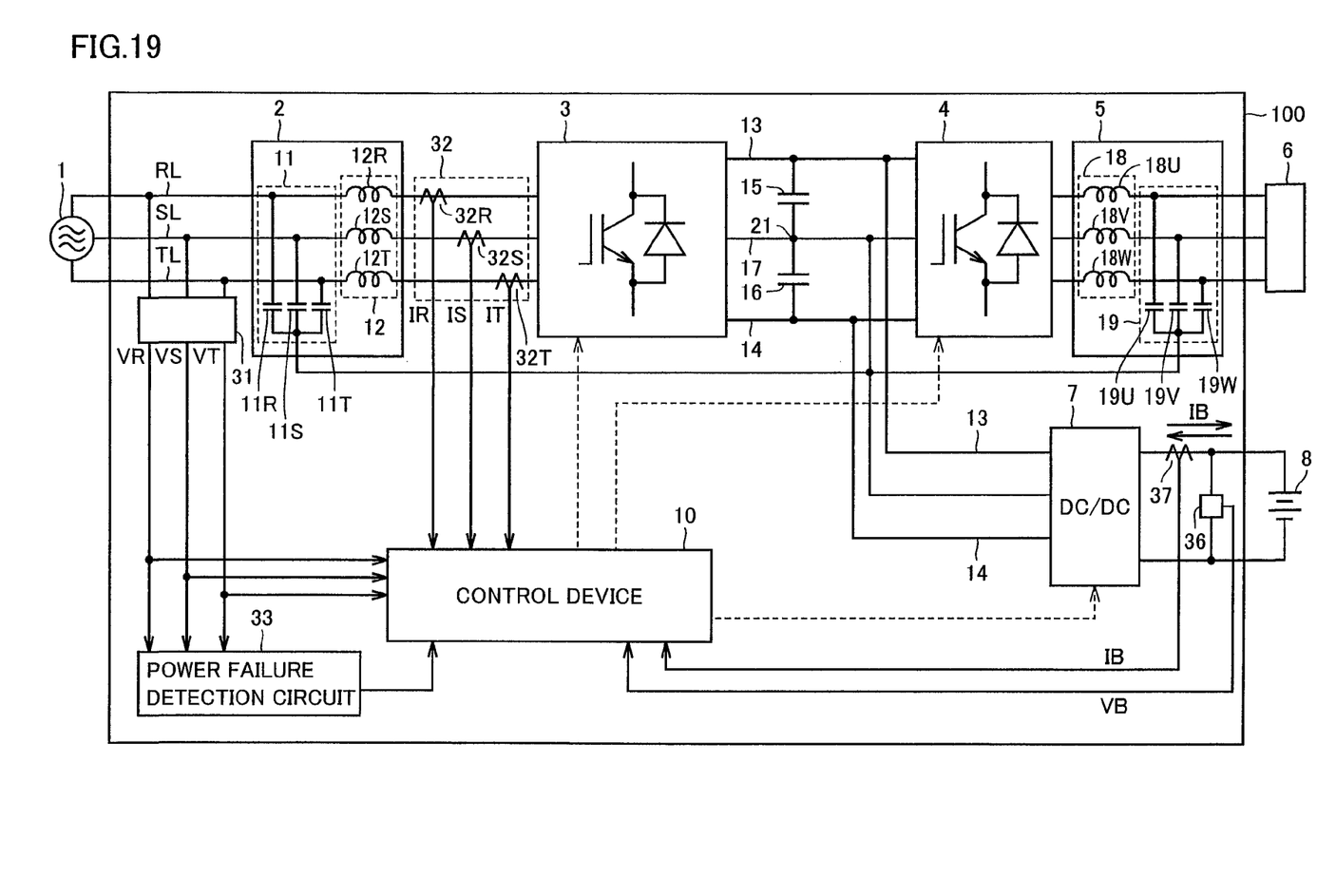
FIG. 19 is a diagram showing a state that a power conversion apparatus according to the present invention is applied to a three-phase, four-wire system.

In addition, in the present embodiment, an uninterruptible power supply system applicable to a three-phase, three-wire system AC power supply and load has been shown, however, the present invention is also applicable to a three-phase, four-wire system AC power supply and load. In the case of the three-phase, four-wire system, as shown in FIG. 19, it is only necessary to connect neutral points of respective capacitors 11 and 19 to neutral point 21. Further, the AC power supply and the AC load are not limited to those of three phases, and a single-phase power supply or load may be adopted. In that case, two multi-level circuits should only be included in each of a converter and an inverter.

In addition, in the present embodiment, a DC voltage converter is applied between the storage battery and the DC bus, however, the DC voltage converter can naturally be eliminated so long as the storage battery within a rated operation range of the DC bus can be selected.

Moreover, in the present embodiment, an example where the power conversion apparatus according to the present invention is applied to the uninterruptible power supply system including the storage battery has been described, however, a filter achieving smaller size and lighter weight that includes a multi-level circuit as well as achieving suppression of fluctuation of a potential to ground is applicable to a power conversion apparatus outputting AC power based on DC power, such as a solar power generation system, a fuel cell power generation system, or a secondary battery energy storage system.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power conversion apparatus, comprising:
   a first conversion device including a first multi-level circuit configured to be able to perform conversion between a DC voltage and an AC voltage varying among at least three voltage values, for converting DC power to AC power for supply to a load;
   a second conversion device for converting AC power from an AC power supply to DC power for supply to said first conversion device;
   a DC positive bus and a DC negative bus;
   first and second capacitors connected in series between said DC positive bus and said DC negative bus;
   a third conversion device for converting a voltage value of power stored in a power storage device and supplying DC power from said power storage device to said first conversion device when power supply by said AC power supply is faulty; and
   a filter including a reactor and a capacitor, for removing a harmonic generated by said first conversion device, wherein
   said third conversion device includes a third multi-level circuit configured to be able to perform conversion between a DC voltage and a DC voltage varying among at least three voltage values, and
   said third multi-level circuit includes
   a first, second, third and fourth semiconductor switching element connected in series,
   a first reactor connected between a point of connection of the first and second semiconductor switching elements and a positive electrode of the power storage device,
   a second reactor connected between a point of connection of the third and fourth semiconductor switching elements and a negative electrode of said power storage device,
   wherein the first and second capacitors are connected between a point of connection of the second and third semiconductor switching elements.

2. The power conversion apparatus according to claim 1, wherein said second conversion device includes a second multi-level circuit identical in configuration to said first multi-level circuit.

3. The power conversion apparatus according to claim 1, wherein
   the DC positive bus and the DC negative bus are configured to transmit DC power from said second conversion device or said third conversion device or DC power from said second conversion device and said third conversion device to said first conversion device, and
   said first multi-level circuit includes
   first to fourth semiconductor switching elements connected in series between said DC positive bus and said DC negative bus,
   first to fourth free-wheeling diodes connected in anti-parallel to said first to fourth semiconductor switching elements respectively, a first clamp diode connected between a neutral point of said first and second capacitors and a point of connection between said first and second semiconductor switching elements, and a second clamp diode connected between said neutral point and a point of connection between said third and fourth semiconductor switching elements.

4. The power conversion apparatus according to claim 1, wherein the filter includes a reactor and a capacitor.

5. The power conversion apparatus according to claim 1, wherein the first and second capacitors are directly connected to the point of connection of the second and third semiconductor switching elements.

* * * * *